G. A. CARLSON.
CLAMP.
APPLICATION FILED MAY 23, 1910.

966,426.

Patented Aug. 9, 1910.

Witnesses
E. Larson
H. M. Brooks.

Inventor
Gustav A. Carlson
By Beeler & Robb
Attorneys

UNITED STATES PATENT OFFICE.

GUSTAV A. CARLSON, OF GLADSTONE, OREGON.

CLAMP.

966,426.  Specification of Letters Patent.  Patented Aug. 9, 1910.

Application filed May 23, 1910.  Serial No. 562,961.

*To all whom it may concern:*

Be it known that I, GUSTAV A. CARLSON, a citizen of the United States, residing at Gladstone, in the county of Clackamas and State of Oregon, have invented certain new and useful Improvements in Clamps, of which the following is a specification.

This invention relates to clamps and has for its object to provide one which may readily be adjusted to exert different powers or pressures in clamping and also to take up wear due to constant use.

Figure 1:
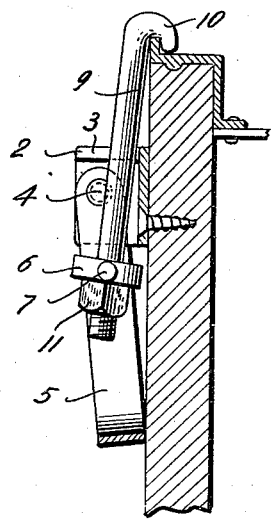
Figure 2:
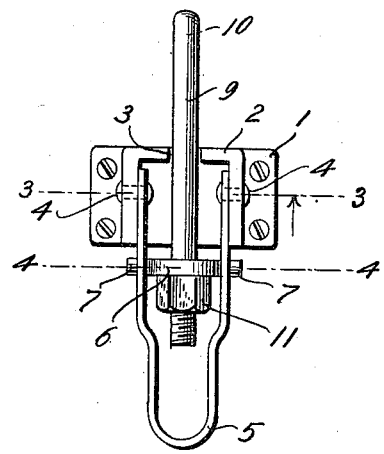
Figure 4:
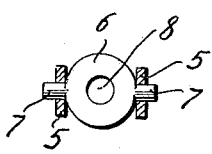
Figure 3:
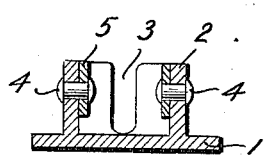

With the above and other objects in view, this invention consists of the construction, combination, and arrangement of parts all as hereinafter more fully described, claimed and illustrated in the accompanying drawings, wherein:

Figure 1 is a longitudinal cross section, parts being left in elevation; Fig. 2 is a plan view thereof; Fig. 3 is a cross section taken on the line 3—3 of Fig. 2; Fig. 4 is a similar view taken on the line 4—4 of Fig. 2.

Referring more particularly to the drawings, 1 indicates a bracket having a U-shaped upwardly extending projection 2, said projection being slotted as at 3 for the purpose to be hereinafter described.

Pivotally connected to the bracket at 4 is a yoke 5, the arms of said yoke being substantially parallel. A portion of the yoke however is of smaller width than the remaining portion.

A draw plate 6 is provided with oppositely extending trunnions 7 which bear in openings provided in the arms of the yoke. The plate 6 is provided with a central bore 8, through which passes the shank 9 of a hook 10, the protruding end of said shank being threaded to receive a nut 11 by which the wear may be taken up or different pressures exerted.

The narrow portion of the yoke 5 is slightly wider than the width of the nut 11 so that by sliding the shank carrying the nut, backward the said nut may be engaged by the arms of the yoke, serving the purpose of a wrench and preventing the nut from turning with the shank 9. It will thus be seen that no extra tools are needed for taking up the wear for adjusting the clamp.

The clamp is secured to a bucket, barrel, or whatever way may be desired to use it, or by any ordinary means, such as screws. In clamping, the hook 10 is placed over the detachable part, as the top of a bucket or barrel, and the two parts clamped together by forcing the yoke or handle 5 to the position as shown in Fig. 1. It will make no difference in the operation of the clamp by placing the same on either part of the body which is to be clamped.

The shank 9 of the hook 10 is adapted to operate in the slot 3 of the bracket, thus protecting the shank or hook from accidental displacement.

From the foregoing it will be seen that when the nut is in engagement with the reduced portion of the yoke the shank 9 may be turned in either direction for the purpose of shortening or lengthening the said shank.

What is claimed as new is:

A clamp of the class described comprising a bracket, a yoke pivoted to said bracket at one end and having its opposite end portion contracted to form a narrow portion, a draw plate pivotally mounted on the sides of the yoke at the wider portion of the latter and provided with a smooth bore, a hook having a shank movable freely through said bore of the draw plate and threaded at its outer end, and a nut screwed upon the threaded outer end portion of said shank and having a bearing against the outer side of the draw plate, the shank being movable through the draw plate to bring the nut into the narrow portion of the yoke, whereby the nut will be held during rotation of the shank for adjusting purposes, said nut being rotatable when it is arranged in the wider portion of the yoke.

In testimony whereof I have affixed my signature in presence of two witnesses.

GUSTAV A. CARLSON.

Witnesses:
HARVEY E. CROSS,
WM. HAMMOND.